US010189401B2

(12) United States Patent
Salter et al.

(10) Patent No.: US 10,189,401 B2
(45) Date of Patent: Jan. 29, 2019

(54) VEHICLE LIGHT STRIP WITH OPTICAL ELEMENT

(71) Applicant: Ford Global Technologies, LLC, Dearborn, MI (US)

(72) Inventors: Stuart C. Salter, White Lake, MI (US); James J. Surman, Clinton Township, MI (US); Paul Kenneth Dellock, Northville, MI (US); Stephen Kenneth Helwig, Farmington Hills, MI (US); Harry Lobo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

(21) Appl. No.: 15/019,190

(22) Filed: Feb. 9, 2016

(65) Prior Publication Data

US 2017/0225612 A1 Aug. 10, 2017

(51) Int. Cl.
*B60Q 1/32* (2006.01)
*B60Q 1/26* (2006.01)

(52) U.S. Cl.
CPC ............. *B60Q 1/32* (2013.01); *B60Q 1/26* (2013.01); *B60Q 1/2696* (2013.01); *B60Q 1/323* (2013.01); *B60Q 2400/10* (2013.01)

(58) Field of Classification Search
CPC .... F21V 7/0091; F21V 7/0025; F21V 5/0085; F21V 5/008; F21V 5/00; B60Q 1/32; B60Q 3/267
See application file for complete search history.

(56) References Cited

U.S. PATENT DOCUMENTS

| 2,486,859 | A | 11/1949 | Meijer et al. |
|---|---|---|---|
| 5,053,930 | A | 10/1991 | Benavides |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,160,475 | A | 12/2000 | Hornung et al. |
| 6,294,990 | B1 | 9/2001 | Knoll et al. |
| 6,419,854 | B1 | 7/2002 | Yocom et al. |
| 6,494,490 | B1 | 12/2002 | Trantoul |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |

(Continued)

FOREIGN PATENT DOCUMENTS

| CN | 101337492 A | 1/2009 |
|---|---|---|
| CN | 201169230 Y | 2/2009 |

(Continued)

*Primary Examiner* — Karabi Guharay
(74) *Attorney, Agent, or Firm* — Jason Rogers; Price Heneveld LLP

(57) ABSTRACT

A vehicle light strip is provided herein. The vehicle light strip includes a housing member. A light assembly is disposed inside the housing member and has a light source and a photoluminescent structure that is configured to luminesce in response to light excitation by the light source. An optical element is configured to transmit a portion of luminescent light toward a front wall of the housing member and direct another portion of luminescent light toward at least one side wall of the housing member.

13 Claims, 7 Drawing Sheets

(56) References Cited

U.S. PATENT DOCUMENTS

| | | |
|---|---|---|
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,452,709 B2 | 9/2016 | Aburto Crespo |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0213351 A1 | 9/2005 | Yang |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0228553 A1 | 9/2011 | Igoe et al. |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0138808 A1 | 5/2015 | Salter et al. |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1* | 5/2016 | Moon ............ H01L 33/58 362/235 |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0253179 A1 | 9/2017 | Kumada |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 8200272 A1 | 2/1982 |
| WO | 2006047306 A1 | 5/2006 |
| WO | 2014068440 A1 | 5/2014 |
| WO | 2014161927 A1 | 10/2014 |

* cited by examiner

VEHICLE LIGHT STRIP WITH OPTICAL ELEMENT

FIELD OF THE INVENTION

The present invention generally relates to vehicle lighting systems and more particularly relates to vehicle lighting systems employing photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a vehicle light strip is provided. The vehicle light strip includes a housing member. A light assembly is disposed inside the housing member and has a light source and a photoluminescent structure that is configured to luminesce in response to light excitation by the light source. An optical element is configured to transmit a portion of luminescent light toward a front wall of the housing member and direct another portion of luminescent light toward at least one side wall of the housing member.

According to another aspect of the present invention, a vehicle light strip is provided. The vehicle light strip includes a housing member coupled to an exterior body panel of a vehicle. A light assembly is disposed inside the housing member and an optical element is configured to direct light received from the light assembly toward a front wall of the housing member and at least one side wall of the housing member.

According to yet another aspect of the present invention, a vehicle light strip is provided. The vehicle light strip includes a housing member coupled to an exterior body panel of a vehicle. A light assembly is disposed inside the housing member and an optical element is configured to direct light emitted by the light assembly toward at least one side wall of the housing member. The light is outputted via the at least one side wall of the housing member to illuminate a portion of the exterior body panel.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
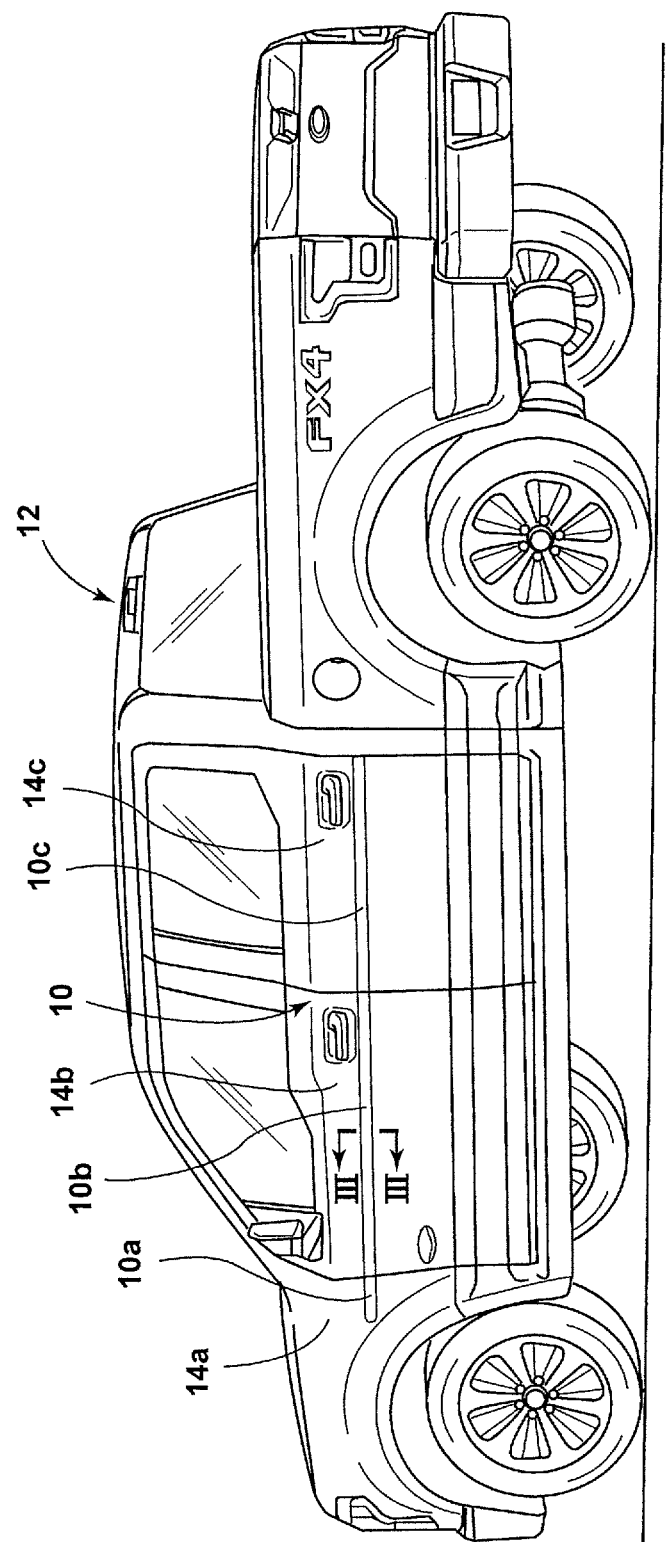
FIG. 1 illustrates a vehicle having a light strip extending across several body panels.
Figure 2:
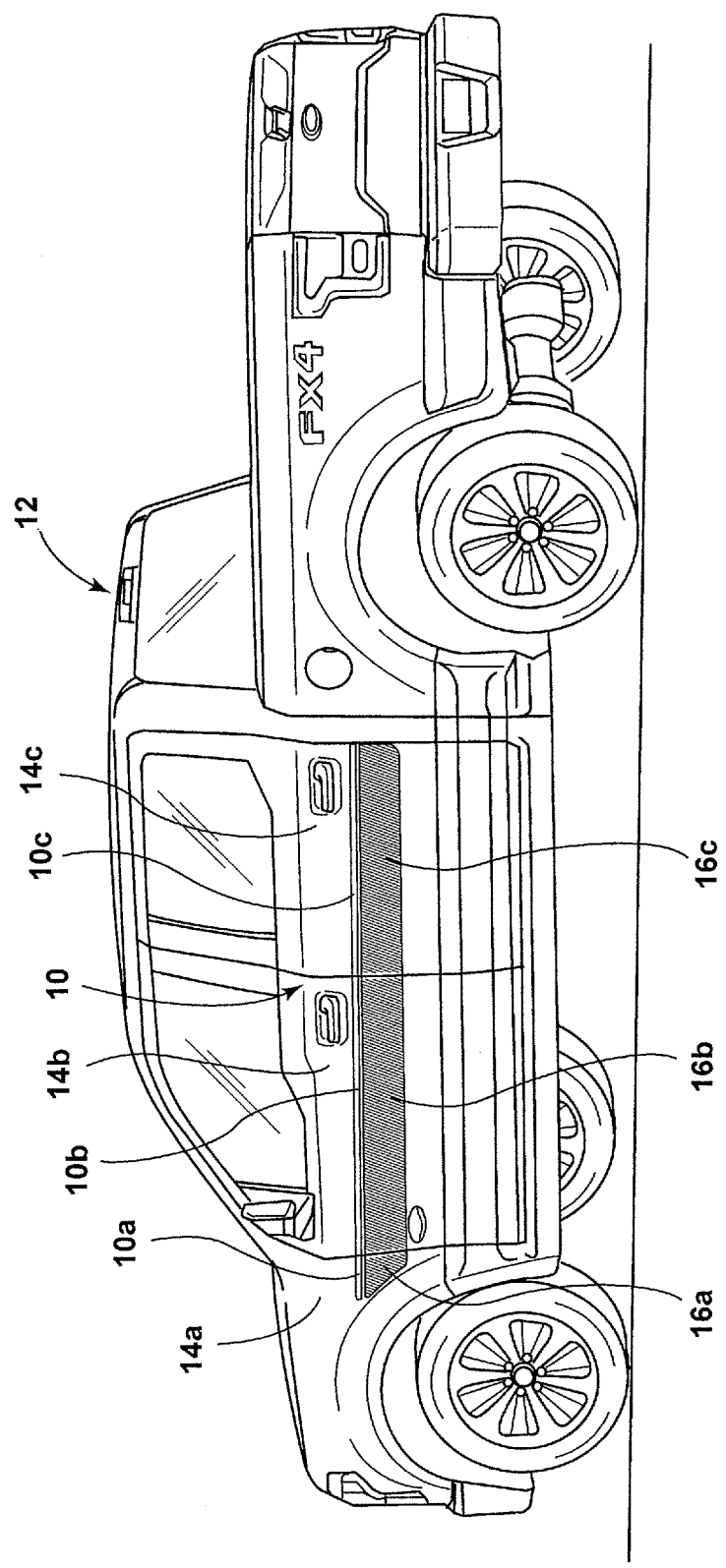
FIG. 2 illustrates a sconce lighting effect produced by the light strip shown in FIG. 1.

Referring to FIGS. 1 and 2, reference numeral 10 generally designates a light strip for use on a vehicle 12, which is exemplarily embodied as a pickup truck. The light strip 10 is shown in a number of segments 10a, 10b, 10c, each of which is coupled to a corresponding exterior body panel 14a, 14b, 14c of the vehicle 12. Body panels 14a-14c are exemplarily depicted as a front body panel, a driver side door panel, and a driver side passenger door panel, respectively. In other embodiments, one or more light strips may be additionally or alternatively be coupled to other exterior panels of the vehicle 12, such as, but not limited to, front panels, rear panels, passenger side panels, roof panels, etc. Furthermore, while the segments 10a-10c of the light strip 10 are shown aligned horizontally, it should be appreciated that the segments 10a-10c may be arranged vertically, at an angle, or in other orientations, if desired. In operation, the segments 10a-10c of the light strip 10 may be controlled to illuminate together or separately. As exemplarily shown in FIG. 2, the segments 10a-10c are operable to produce sconce lighting directed in a downward direction to illuminate a corresponding portion 16a-16c of the body panels 14a-14c located below each segment 10a-10c. Additionally or alternatively, the segments 10a-10c may be configured to produce sconce lighting directed in an upward direction to illuminate portions of the body panels 14a-14c located above the segments 10a-10c. Furthermore, portions of the segments 10a-10c may be operable to illuminate in addition to or instead of producing sconce lighting. As will be described further herein, the illumination produced by a given segment 10a-10c may be luminescent in some embodiments.

Figure 3:
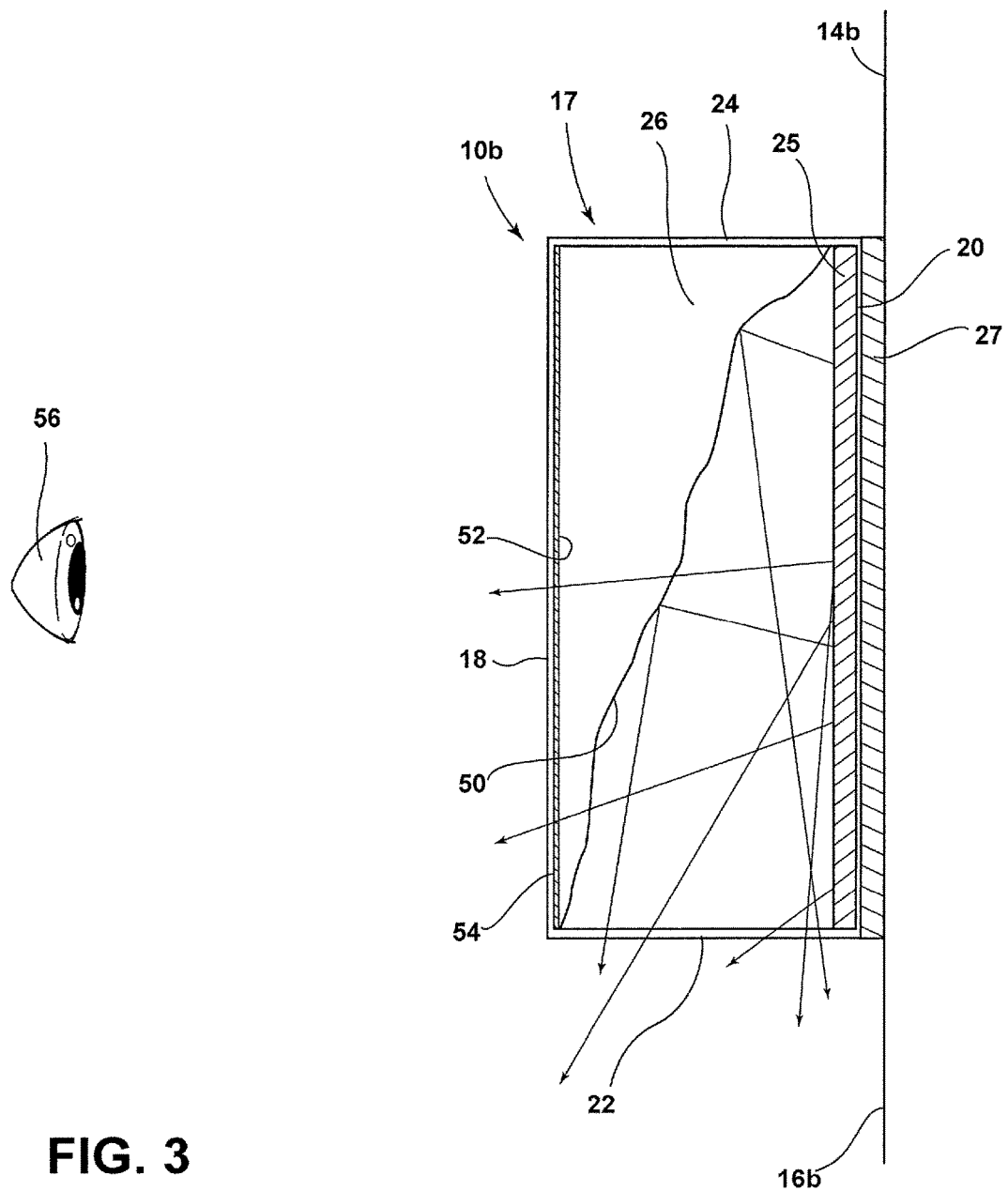
FIG. 3 is a cross-sectional view of a first embodiment of a segment of the light strip taken along line III-III of FIG.1.

Referring to FIG. 3, a cross-sectional view of segment 10b is shown according to one embodiment. It should be appreciated that segments 10a and 10c may be similarly configured. According to the embodiment shown in FIG. 3, segment 10b includes a housing member 17 having a generally rectangular cross-section. The housing member 17 includes a front wall 18, a rear wall 20, and side walls 22, 24. In alternative embodiments, it is contemplated that the housing member 17 may include other cross-sectional shapes if desired. The housing member 17 may be constructed from a clear light-permeable plastic and houses a light assembly 25 and an optical element 26, both of which may extend the length of the light strip 10b. According to one embodiment, the housing member 17 may be coupled to exterior body panel 14b via an adhesive 27 located on the rear wall 20 of the housing member 17. However, the use of mechanical fasteners or other securing devices is contemplated in alternative embodiments.

Figure 4:
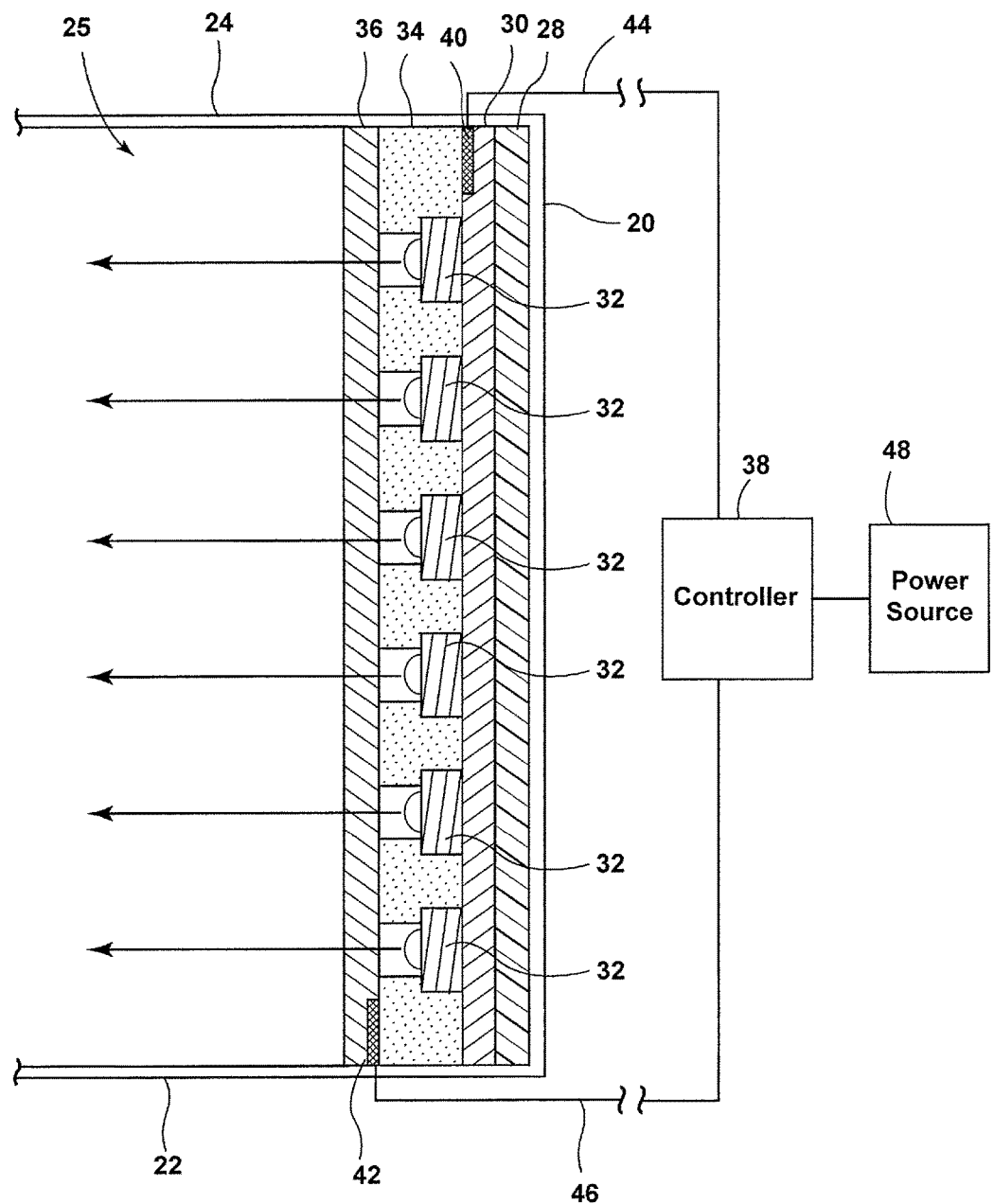
FIG. 4 is an enlarged view of a light assembly shown in FIG. 3, according to a first embodiment.

Referring to FIG. 4, the light assembly 25 is shown according to one embodiment. The light assembly 25 includes a substrate 28 disposed on the interior surface of the rear wall 20. The substrate 28 may include a substantially transparent polycarbonate, poly-methyl methacrylate (PMMA), or polyethylene terephthalate (PET) material on the order of 0.005 to 0.060 inches thick. A positive electrode 30 is arranged over the substrate 28 and includes a conductive material such as, but not limited to, indium tin oxide. The positive electrode 30 is electrically connected to a light source, which is shown as a plurality of printed light-emitting diodes (LED) 32 arranged within a semiconductor ink 34 and applied over the positive electrode 30. A negative electrode 36 is also electrically connected to the LEDs 32. The negative electrode 36 is arranged over the semiconductor ink 34 and includes a transparent or translucent conductive material such as, but not limited to, indium tin oxide. In alternative embodiments, the positive and negative electrodes 30, 36 may swap positions if desired. The positive and negative electrodes 30, 36 are electrically connected to a controller 38 via a corresponding bus bar 40, 42 and a conductive lead 44, 46. The bus bars 40, 42 may be printed along opposite edges of the positive and negative electrodes 30, 36 and the points of connection between the bus bars 40, 42 and the conductive leads 44, 46 may be at opposite corners of each bus bar 40, 42 to promote uniform current distribution along the bus bars 40, 42. The controller 38 may be located anywhere in the vehicle 12 and is electrically connected to a power source 48, which may correspond to a vehicular power source operating at 12 to 16 VDC. It should be appreciated that segments 10a and 10c may each be electrically connected to the controller 38 or a separate controller.

The LEDs 32 may be dispersed in a random or controlled fashion within the semiconductor ink 34 and are oriented to emit light toward the optical element 26. The LEDs 32 may correspond to micro-LEDs of gallium nitride elements on the order of 5 to 400 microns in size and the semiconductor ink 34 may include various binders and dielectric material including, but not limited to, one or more of gallium, indium, silicon carbide, phosphorous, and/or translucent polymeric binders. In this manner, the semiconductor ink 34 may contain various concentrations of LEDs 32 such that the density of the LEDs 32 may be adjusted for various lighting applications. The semiconductor ink 34 can be applied through various printing processes, including ink jet and silk screen processes to selected portion(s) of the positive electrode 30. More specifically, it is envisioned that the LEDs 32 are dispersed within the semiconductor ink 34, and shaped and sized such that they align with the positive and negative electrodes 30, 36 during deposition of the semiconductor ink 34. Additional information regarding the construction of light-producing assemblies is disclosed in U.S. Patent Publication No. 2014-0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference. While the light assembly 25 is described herein as including a printed LED arrangement, the LEDs 32 may be mounted to a printed circuit board secured to the back wall 20 of the housing member 17 in alternative embodiments.

Referring back to FIG. 3, the optical element 26 is located inside the housing member 17 and is disposed between the light assembly 25 and the front wall 18 of the housing member 17. In the presently illustrated embodiment, the optical element 26 may be constructed from a substantially transparent plastic and is configured to transmit a portion of light emitted from the light assembly 25 (e.g., LEDs 32) toward the front wall 18 of the housing member 17 and direct another portion of light emitted from the light assembly 25 toward side wall 22 of the housing member 17. It is contemplated that the optical element 26 may benefit from one piece or multi-piece construction and may have light diffusing qualities. Additionally, the light distribution toward the front wall 18 and side wall 22 may be controlled by varying the density of the LEDs 32. According to one embodiment, the density of the LEDs 32 may increase towards side walls 22 and/or 24 to increase the amount of light directed theretoward.

Light that is transmitted through the optical element 26 enters via a first surface 50 and is outputted via a second surface 52 to illuminate the front wall 18 of the housing member 17. The first surface 50 may be planar or non-planar. For purposes of illustration, the first surface 50 is shown in a random non-planar arrangement such that a portion of the light emitted by the LEDs 32 is transmitted through the optical element 26 while another portion of the light is transmitted toward wall 22 based on the manner in which the light strikes the first surface 50. According to one embodiment, a metallized layer 54 is disposed between the optical element 26 and the front wall 18 of the housing member 17. The metallized layer 54 may be deposited on the second surface 52 of the optical element 26 and/or the underside of the front wall 18 via partial vacuum deposition or other suitable means known in the art. The metallized layer 54 is configured to provide a metallic appearance to the front wall 18 of the housing member 17 when viewed by a viewer 56 outside the vehicle 12. The metallized layer 54 is also light transmissive with regards to light emitted by the LEDs 32 of the light assembly 25. Additionally, side walls 22 and 24 may also be metallized if desired.

With continued reference to FIG. 3, the first surface 50 of the optical element 26 is configured to direct (e.g., reflect) a portion of light emitted by the LEDs 32 toward side wall 22. The first surface 50 may be contoured in a variety of shapes such that light directed toward side wall 22 illuminates the same to create a variety of lighting effects. In one embodiment, the first surface 50 may be configured such that a portion of the light directed toward side wall 22 is outputted therefrom to illuminate portion 16b of the body panel 14b, thereby producing the sconce lighting effect depicted in FIG. 2 when viewed from the vantage point of viewer 56. Additionally or alternatively, light emitted through wall 22 may produce an illuminated border effect when viewed from the vantage point of viewer 56.

Figure 5:
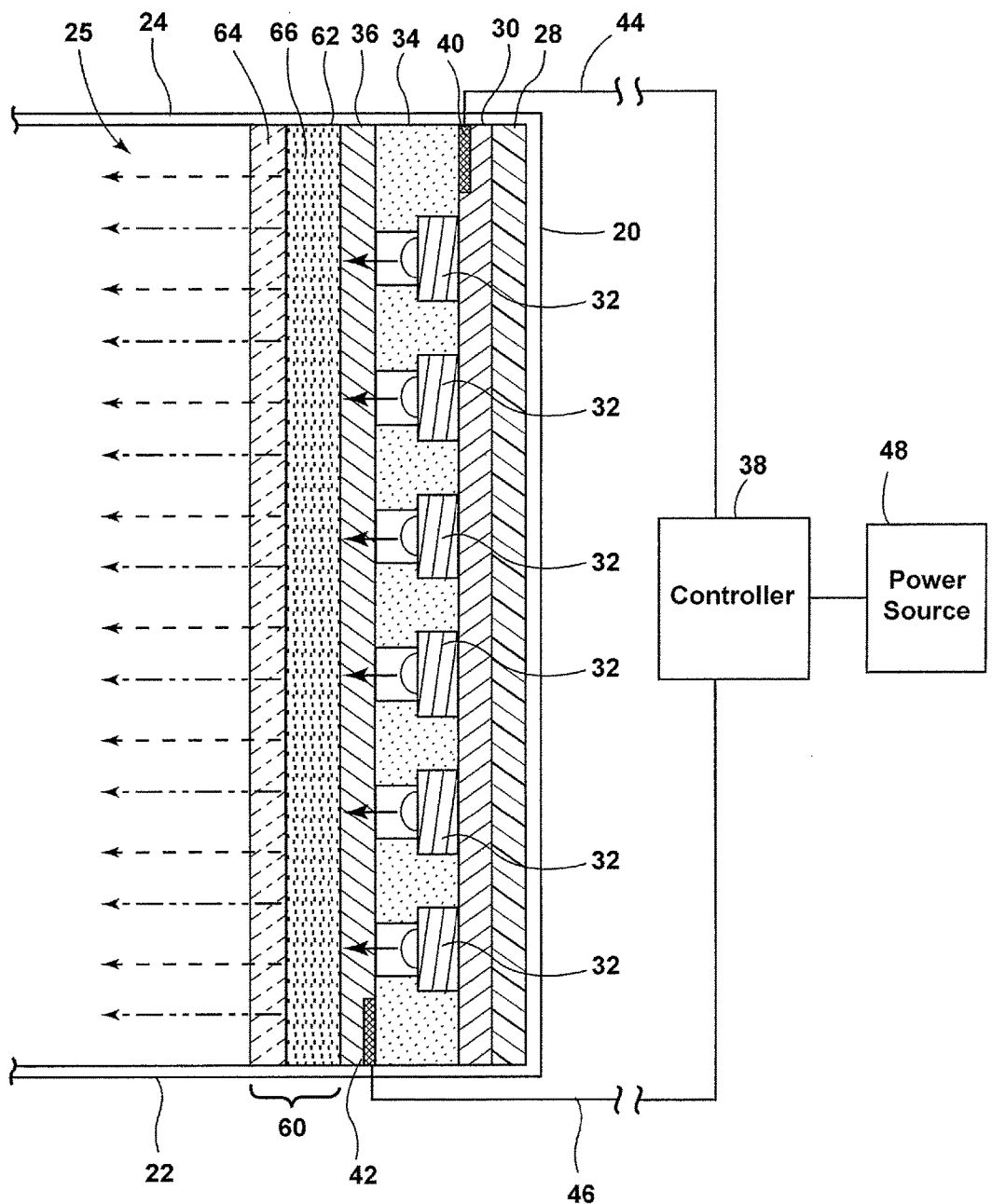
FIG. 5 is an enlarged view of the light assembly shown in FIG. 3, according to a second embodiment.

Referring to FIG. 5, the light assembly 25 is shown according to an alternative embodiment. The light assembly 25 may be configured similarly to that shown in FIG. 4 with the addition of a photoluminescent structure 60, which is arranged over the negative electrode 36 as a coating, layer, film, or other suitable deposition. With respect to the presently illustrated embodiment, the photoluminescent structure 60 may be arranged as a multi-layered structure including an energy conversion layer 62 and an optional stability layer 64. The energy conversion layer 62 includes at least one photoluminescent material 66 having energy converting elements with phosphorescent or fluorescent properties. For example, the photoluminescent material 66 may include organic or inorganic fluorescent dyes including rylenes, xanthenes, porphyrins, phthalocyanines. Additionally or alternatively, the photoluminescent material 66 may include phosphors from the group of Ce-doped garnets such as YAG:Ce. The energy conversion layer 62 may be prepared by dispersing the photoluminescent material 66 in a polymer matrix to form a homogenous mixture using a variety of methods. Such methods may include preparing the energy conversion layer 62 from a formulation in a liquid carrier medium and coating the energy conversion layer 62 to the negative electrode 36 or other desired substrate. The energy conversion layer 62 may be applied to the negative electrode 36 by painting, screen printing, flexography, spraying, slot coating, dip coating, roller coating, and bar coating. Alternatively, the energy conversion layer 62 may be prepared by methods that do not use a liquid carrier medium. For example, the energy conversion layer 62 may be rendered by dispersing the photoluminescent material 66 into a solid state solution (homogenous mixture in a dry state) that may be incorporated in a polymer matrix formed by extrusion, injection, compression, calendaring, thermoforming, etc.

To protect the photoluminescent material 66 contained within the energy conversion layer 62 from photolytic and thermal degradation, the photoluminescent structure 60 may optionally include a stability layer 64. The stability layer 64 may be configured as a separate layer optically coupled and adhered to the energy conversion layer 62 or otherwise integrated therewith. The stability layer 64 may be combined with the energy conversion layer 62 through sequential coating or printing of each layer, sequential lamination or embossing, or any other suitable means. Additional information regarding the construction of structures having photoluminescent properties is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

According to one embodiment, the photoluminescent structure 60 is configured to luminesce in response to light excitation by the LEDs 32. Excitation light emitted by the LEDs 32 undergoes an energy conversion where it's converted by the photoluminescent material 66 and re-emitted therefrom at a different wavelength. According to one embodiment, the photoluminescent material 66 may be formulated to convert the excitation light into a longer wavelength light, otherwise known as down conversion. Alternatively, the photoluminescent material 66 may be formulated to convert the excitation light into a shorter wavelength light, otherwise known as up conversion. With respect to the energy conversion process described herein, the difference in wavelength between the excitation light and the converted light is known as the Stokes shift and serves as the principle driving mechanism for an energy conversion process corresponding to a change in wavelength of light.

According to one embodiment, the photoluminescent material 66 is formulated to have a Stokes shift resulting in the converted light having an emission spectrum expressed in a desired color. For example, the energy conversion process may be undertaken by way of down conversion, whereby the inputted light includes light on the lower end of the visibility spectrum such as blue, violet, or ultraviolet (UV) light. Doing so enables blue, violet, or UV LEDs to be used as the LEDs 32, which generally offers a relative cost advantage over other colors of LEDs or simply using LEDs of the desired color and omitting the photoluminescent structure 60 altogether.

The converted light, also referred to herein as luminescent light, may be expressed in any color of an RGB color model, including white light, and is emitted from the photoluminescent structure 60 toward the optical element 26 where a portion is transmitted therethrough to illuminate the front wall 18 of the housing member 17 and another portion is directed by the optical element 26 toward side wall 22 to create a luminous border effect and/or illuminate portion 16b of the body panel 14b. With respect to the embodiments described herein, light emitted from the LEDs 32 is represented by solid arrows whereas luminescent light emitted by the photoluminescent structure 60 is represented by broken arrows.

Figure 6:
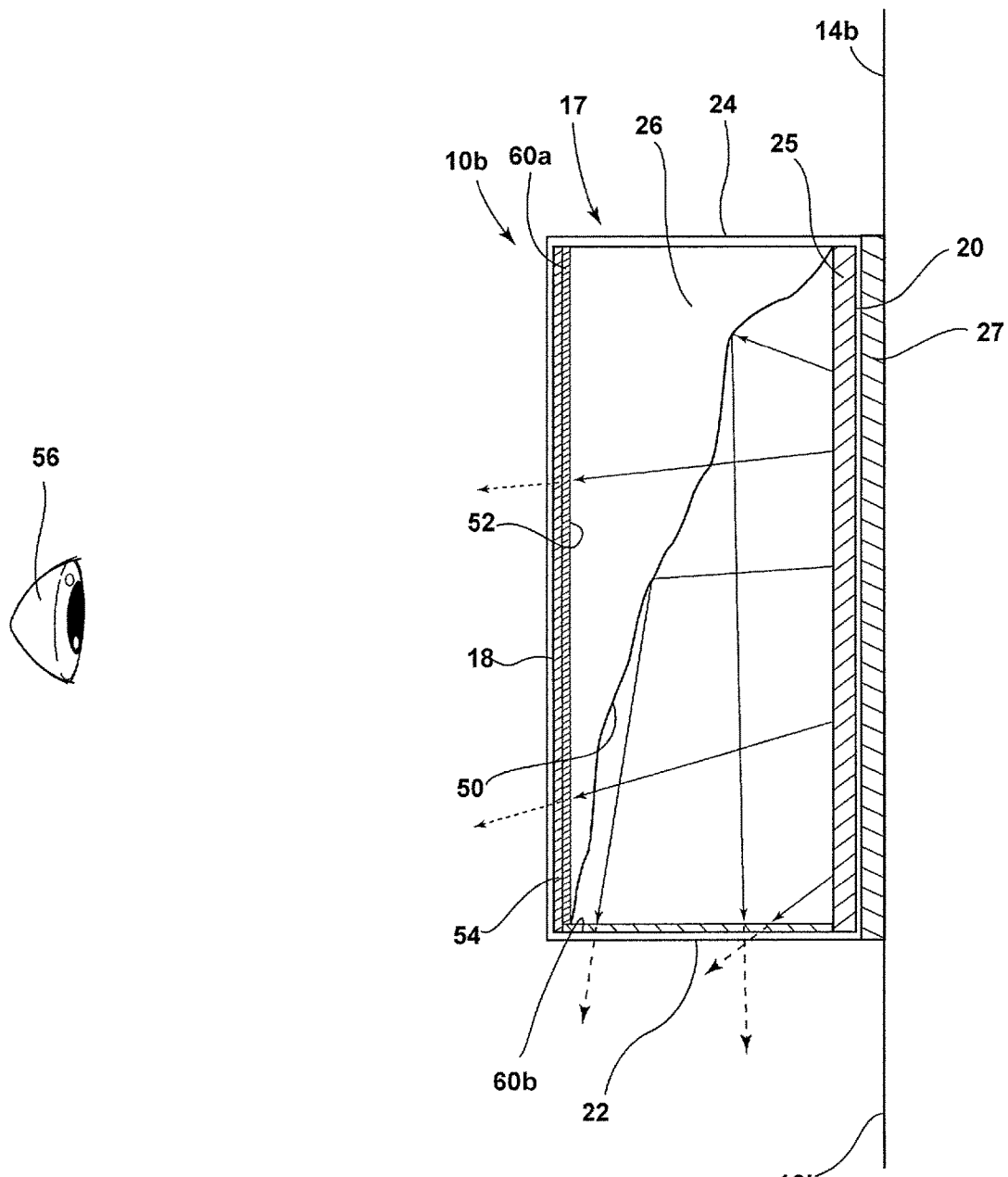
FIG. 6 is a second embodiment of the segment of the light strip shown in FIG. 3.

Referring to FIG. 6, another alternative embodiment of the light strip 10b is shown. The light strip 10b may be configured similarly to that shown in FIG. 3, with the addition of a first photoluminescent structure 60a disposed between the second surface 52 of the optical element 26 and the metallized layer 54. Additionally or alternatively, a second photoluminescent structure 60b is coupled to side wall 22. The photoluminescent structures 60a, 60b may each be configured similarly to that shown in FIG. 5 and may be formulated to luminesce in response to excitation light supplied by the LEDs 32. Specifically, photoluminescent structure 60a receives excitation light that is transmitted through the optical element 26 whereas photoluminescent structure 60b receives excitation light that is directed theretoward by the first surface 50 of the optical element 26. In turn, luminescent light emitted by the first photoluminescent structure 60a may serve to illuminate the front wall 18 of the housing member 17 whereas luminescent light emitted by the second photoluminescent structure 60b serves to create a luminous border effect and/or illuminate portion 16b of the body panel 14b. It is contemplated that the photoluminescent structures 60a, 60b may be configured to luminesce in the same colored light or different colors.

Figure 7:
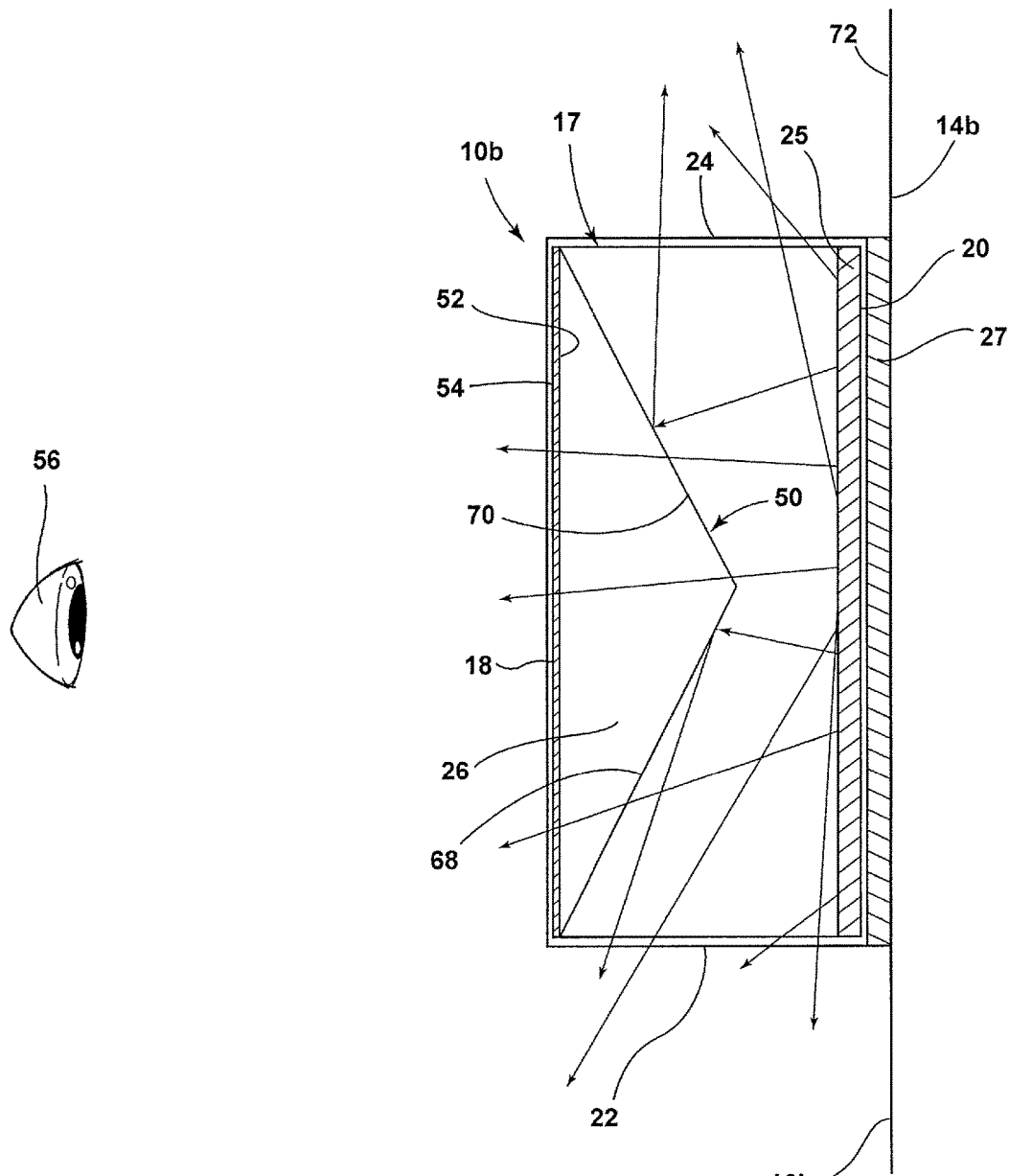
FIG. 7 is a third embodiment of the segment of the light strip shown in FIG. 3.

Referring to FIG. 7, yet another embodiment of the light strip 10b is shown. The light strip 10 may be configured similarly to that in FIG. 3, except the optical element 26 is configured to transmit a portion of light toward the front wall 18 of the housing member 17 and direct other portions of light toward each of the side walls 22, 24. As shown, the optical element 26 may include a cross-section having an inverted triangular shape wherein the first surface 50 includes a first section 68 for directing light toward side wall 22 and a second section 70 for directing light toward side wall 24. With respect to the illustrated embodiment, light may be provided directly by the LEDs 32 in one embodiment. Alternatively, the light may be provided by a photoluminescent structure 60 arranged over the LEDs 32 similar to that shown in FIG. 5. Alternatively still, a photoluminescent structure (not shown) may be coupled to one or all of the front wall 18 and the side walls 22, 24 of the housing member 17, respectively. In use, the photoluminescent structures luminesces in response to excitation light supplied by the light assembly 25, which may be configured according to that shown in FIG. 4. The photoluminescent structures may be configured to luminesce in the same color or a different color. According to one embodiment, the front wall 18 is to illuminate in a blue color whereas light outputted from the side walls 22 and 24 is expressed in an amber color. Accordingly, light transmitted through the optical element 26 ultimately illuminates the front wall 18 of the housing member 26 whereas light directed toward side walls 22 and 24 may serve to create a luminous border effect and/or illuminate portions 16b and 72 of the body panel 14b. In such a configuration, it is possible to produce sconce lighting above and below the light strip 10b when viewed from the vantage point of the viewer 56.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle light strip comprising:
   a housing member;
   a light assembly inside the housing member and having a light source and a photoluminescent structure that is configured to luminesce in response to light excitation by the light source; and
   an optical element having a cross-section with an inverted triangular shape, a first surface of the optical element defining a hypotenuse having a random non-planar arrangement configured to transmit a portion of luminescent light toward a front wall of the housing member and direct another portion of luminescent light toward at least one side wall of the housing member.

2. The vehicle light strip of claim 1, wherein the housing member is adhered to an exterior panel of a vehicle.

3. The vehicle light strip of claim 1, wherein the light assembly is disposed inside the housing member and the light source comprises a plurality of printed light-emitting diodes oriented to face the front wall of the housing member.

4. The vehicle light strip of claim 3, wherein the plurality of printed light-emitting diodes are dispersed in increasing density toward the at least one side wall of the housing member.

5. The vehicle light strip of claim 1, wherein the optical element is disposed between the photoluminescent structure and the front wall of the housing member.

6. The vehicle light strip of claim 1, wherein the optical element directs a first portion of luminescent light toward a first side wall of the housing member and directs a second portion of luminescent light toward a second side wall of the housing member.

7. The vehicle light strip of claim 1, wherein the luminescent light directed toward the at least one side wall of the housing member is outputted therethrough to produce sconce lighting against the vehicle.

8. The vehicle light strip of claim 1, further comprising a metallized layer coupled to the front wall of the housing member.

9. A vehicle light strip comprising:
   a light assembly configured to couple to an exterior of a vehicle; and
   an optical element having a cross-section with an inverted triangular shape and defining an apex and a hypotenuse having a random non-planar surface, wherein the light assembly emits a greater amount of light from a first position further from the apex than a second position closer to the apex than the first position.

10. The vehicle light strip of claim 9, wherein the light assembly comprises a plurality of printed light-emitting diodes.

11. The vehicle light strip of claim 10, wherein the plurality of printed light-emitting diodes are dispersed in increasing density toward the at least one side wall of the housing member.

12. The vehicle light strip of claim 10, wherein the light assembly comprises a photoluminescent structure that is coupled to the plurality of printed light-emitting diodes and is configured to luminesce in response to light excitation by the plurality of printed light-emitting diodes.

13. The vehicle light strip of claim 9, further comprising a metallized layer coupled to a front wall of the housing member.

* * * * *